Nov. 3, 1936.  R. M. PETERSIME  2,059,533
HATCHING COMPARTMENT FOR AN INCUBATOR
Filed May 6, 1935   2 Sheets-Sheet 2
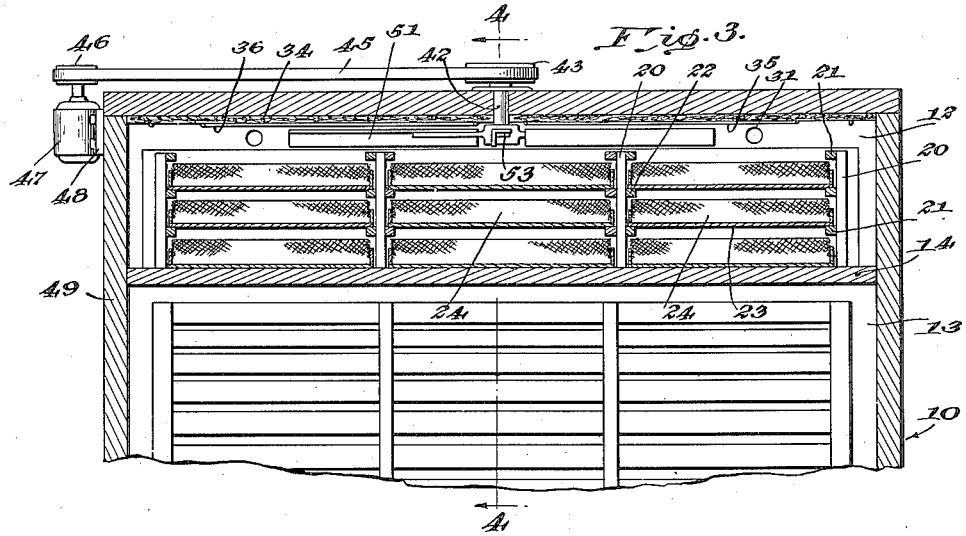
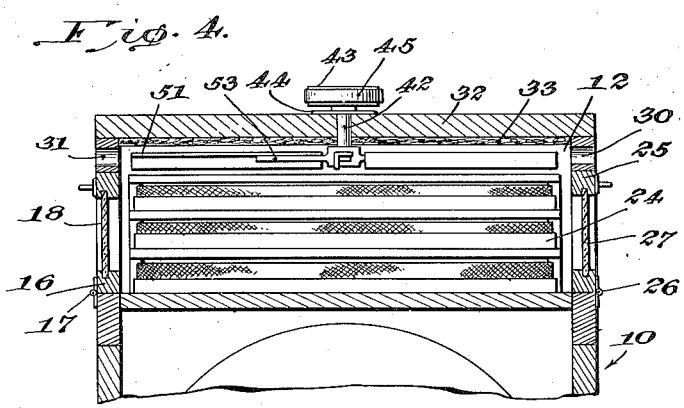
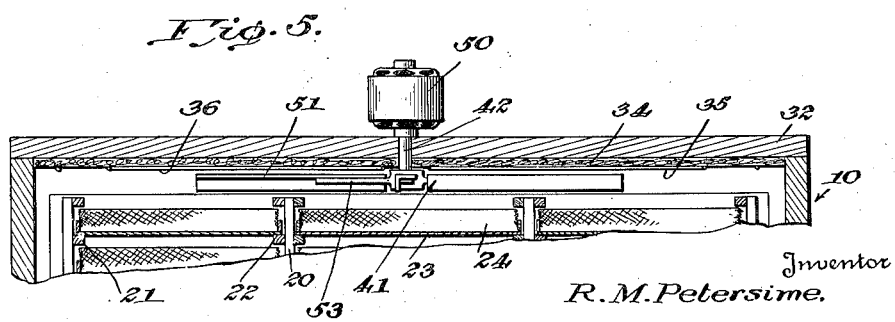
Inventor
R. M. Petersime.

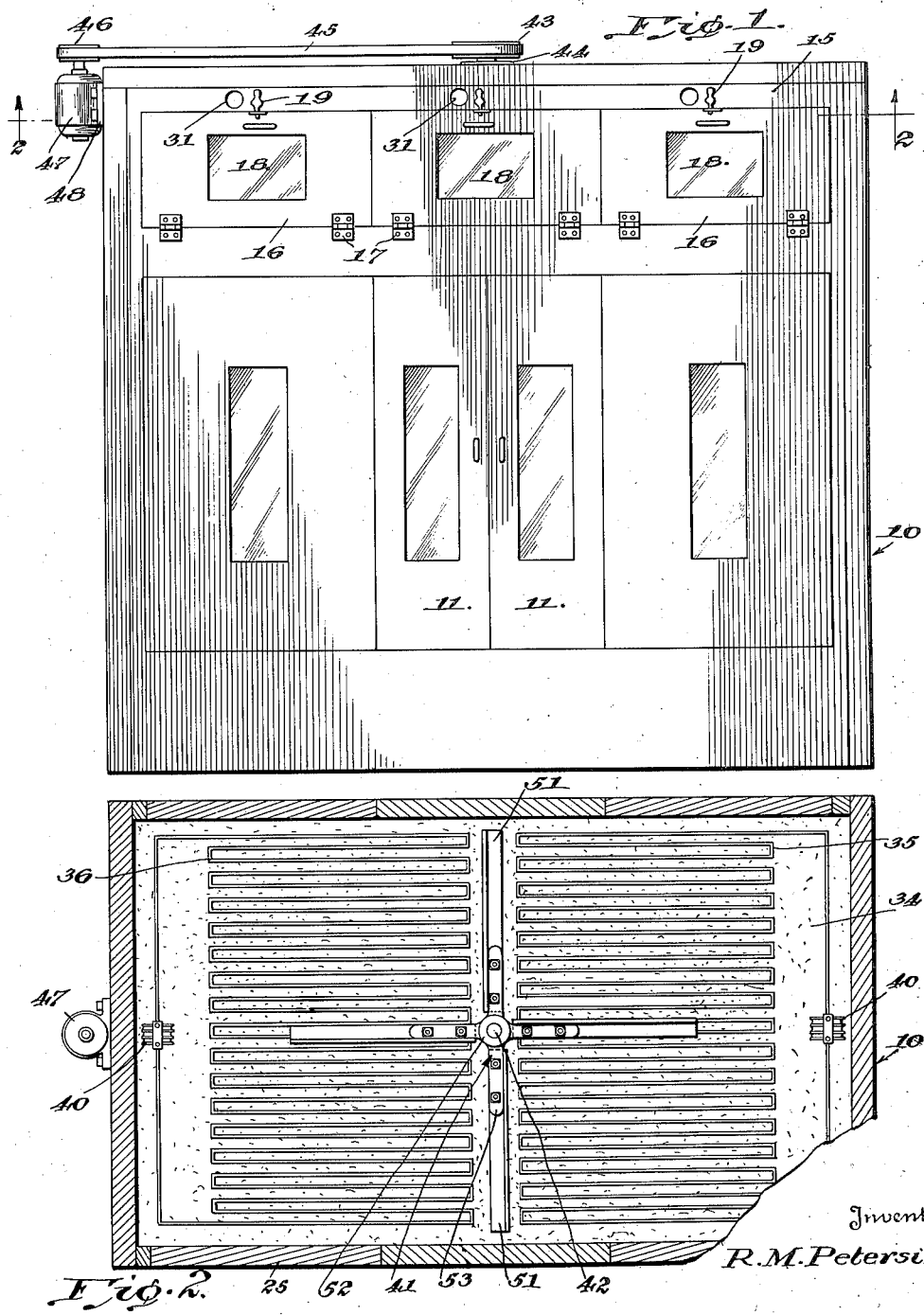

Patented Nov. 3, 1936

2,059,533

UNITED STATES PATENT OFFICE 2,059,533

HATCHING COMPARTMENT FOR AN INCUBATOR

Ray M. Petersime, Gettysburg, Ohio

Application May 6, 1935, Serial No. 20,081

3 Claims. (Cl. 119—37)

This invention relates to a hatching compartment for an incubator.

An object of the invention is the provision of a hatching compartment formed in an incubator with the hatching compartment sealed from the incubator compartment in such a manner that air and foreign matter cannot pass from one of the compartments to the other compartment.

Another object of the invention is the provision of a hatching compartment for supporting a plurality of horizontally disposed layers of eggs with means for causing a pulsation of the air in the compartment without creating a draft so that the air is caused to move mildly through the eggs with means for discharging vitiated air and for supplying the compartment with fresh air.

A further object of the invention is the provision of a hatching compartment in an incubator in which the hatching compartment is sealed from the incubating compartment, means being employed for heating the air in the compartment at a point above trays with means for causing pulsation of the warm air through the eggs without creating a draft.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a view in elevation of an incubator having a hatching compartment at the top thereof, Figure 2 is a horizontal section taken on the line 2—2 of Figure 1, Figure 3 is a view of the upper portion of Fig. 1, with parts broken away, Figure 4 is a transverse vertical section taken along the line 4—4 of Fig. 3, and Figure 5 is a fragmentary vertical section showing a modified form.

Referring more particularly to the drawings, 10 designates generally an incubator provided with doors 11 and a hatching compartment 12 which is sealed from the incubator compartment 13 by means of a partition 14 which forms the floor of the hatching compartment and the ceiling of the incubator compartment 13. Thus it will be seen that there will be no circulation of air between the hatching compartment and the incubator compartment whereby foreign matter, including chick down, will be prevented from passing from the hatching compartment into the incubator compartment and vice versa.

The front wall 15 of the hatching compartment is provided with doors 16 hinged at 17 and these doors are provided with windows 18 whereby the interior of the compartment may be inspected without opening the doors. Latches 19 are provided for maintaining the doors closed.

The interior of the hatching compartment 12 is provided with a plurality of uprights 20 having cleats 21 and 22 which form supports for the bottoms 23 of trays 24. These trays may be withdrawn by sliding them along the cleats 21 and 22 through the open doors 16.

The rear wall of the hatching compartment is also provided with doors 25, hinged at 26, and these doors are also provided with transparent members 27 and the rear doors are of similar construction to the front doors.

The rear wall, as shown at 30, is provided with spaced openings and the front wall directly opposite the openings 30 is also provided with openings 31 for the admission and discharge of air between the hatching compartment 12 and the atmosphere.

The underface of the top 32 of the hatching compartment is provided with a heater generally designated by the numeral 33. This heater consists of a sheet of insulating board 34 and resistance wires 35. As shown more particularly in Fig. 2, the resistance wires 35 are disposed in parallel relation and connected to the underface of the insulating board 34. The resistance wires 36 are arranged similar to that shown with reference to the wires 35.

A thermostat 40 or any other suitable device or instrument is connected with the wires 35 and 36 to properly control the temperature of the wires 35 and 36 when a suitably supplied current of electricity is flowing through them.

An agitator generally indicated by the numeral 41 which is of particular design is connected to a shaft 42 extending through the top 32 of the hatching compartment. A pulley 43 is connected to the outer end of the shaft and the pulley is supported by a bearing 44 mounted on the top 32. This pulley is driven by a belt 45 which is trained over a pulley 46 driven by an electric motor 47 secured at 48 to a side wall 4, of the incubator.

As shown in Fig. 5, a modified form of the drive is disclosed in which an electric motor 50 is directly connected to the shaft 42 of the fan 41.

The agitator or pulsating device consists of a plurality of blades 51 and these blades are of angle iron construction and are connected to a hub 52 of the agitator by means of straps or bars 53. The number of blades 51, however, must be limited since it is designated to create a pulsating movement of the air within the incubator compartment.

The operation of my device is as follows: The eggs placed in the hatching compartment have been removed from the incubating compartment after they have been set for approximately eighteen days and the heater in the form of the resistance wires 35 and 36 is set in operation as is the agitator 41 by means of an electric motor. As a matter of fact, when the time approaches for placing the eggs in the hatching compartment the current is turned on to the heater in order to bring the compartment to the proper temperature so that the eggs will not be chilled when they are placed in the hatching compartment.

The agitator in connection with the walls of the compartment and the trays due to the limited number of blades in the agitator causes a pulsating movement of the air through the eggs since this fan is driven from approximately one hundred revolutions to approximately two hundred and fifty revolutions per minute. In other words, the agitator is driven sufficiently to cause a mild circulation of the air which might be termed an inspiration and aspiration of the air through the eggs.

Therefore, the method of hatching eggs by this device consists in arranging layers of eggs to be hatched in a closed space, heating air confined in the same above the topmost layer of eggs, creating a pulsating movement of air through all of the eggs while discharging some of the air from the space to the atmosphere and admitting fresh air to the space.

It will be appreciated that while the air is being circulated through the compartment and entirely through the eggs some of the air is forced out through the passages 30 and 31 and fresh air enters the compartment through the same passages. While I have not shown thermometers and means for maintaining proper humidity in the hatching compartment 12, it will be appreciated that such instruments are employed as is usual.

The agitator is so constructed and positioned that it will move the air to create a breathing or pulsating movement. This agitator is disposed in a horizontal plane which passes through the ventilating openings 31 in the attaching compartment. Furthermore, it will be noted that the blades are flat and are mounted at right angles to their support. Thus it will be seen that all forced drafts which will move the air in one direction are eliminated.

While I have shown the hatching compartment at the top of the incubating compartment it will be appreciated that said compartment may be disposed in various positions relative to the incubating compartment.

I claim:

1. In an incubator, a hatching compartment included therein, an insulating board secured to the underface of the top of the hatching compartment, an electrical heating means carried by the underface of the board and extending substantially over the surface of the top, an agitator located below and adjacent to the heating means, means on the top of the hatching compartment for causing rotation of the agitator, some of the walls of the hatching compartment being provided with a series of openings connecting the interior of the hatching compartment with the atmosphere, said openings lying in a horizontal plane just below the undersurface of the insulating board and in a plane passing through the agitator, and a plurality of spaced trays below the revolving agitator, the agitator creating a pulsating movement of the air within the hatching compartment so that air is not only caused to move downwardly through the trays but some of the air is discharged to the atmosphere and fresh air is drawn into said compartment.

2. In an incubator, a hatching compartment, an insulating board secured to the undersurface of the top of said compartment, an electrical heating means extending over substantially the underface of the insulating board, a shaft projecting through the top and insulating board, means supported on the top for rotating said shaft, a plurality of spaced egg trays below the heating means, and an agitator disposed in a horizontal plane directly below the heating means and composed of angle iron bars radiating from the shaft and revolved at a speed which will create a pulsating movement of the air above the trays so that the air warmed by the heating means will move downwardly through the trays without causing a draft.

3. In an incubator, a hatching compartment, and insulating board secured to the undersurface of the top of said compartment, an electrical heating means extending over substantially the underface of the insulating board, a shaft projecting through the top and insulating board, means supported on the top for rotating said shaft, a plurality of spaced egg trays below the heating means, some of the walls being provided with openings in a plane below the heating means, and an agitator disposed in a horizontal plane passing through the openings and composed of angle iron bars radiating from the shaft, the free ends of the bars moving across the openings for not only creating a pulsating movement of the air through the trays but for causing alternate discharges of air to the atmosphere and intakes of fresh air.

RAY M. PETERSIME.